Nov. 29, 1955 J. J. KLEIMACK 2,725,317

METHOD OF FABRICATING AND HEAT TREATING SEMICONDUCTORS

Filed April 24, 1952

INVENTOR
J. J. KLEIMACK
BY
[signature]
ATTORNEY

United States Patent Office 2,725,317

Patented Nov. 29, 1955

2,725,317

METHOD OF FABRICATING AND HEAT TREATING SEMICONDUCTORS

Joseph J. Kleimack, Scotch Plains, N. J., assignor to Bell Telephone Laboratories, Incorporated, New York, N. Y., a corporation of New York Application April 24, 1952, Serial No. 284,035

4 Claims. (Cl. 148—11.5)

Figure 1:
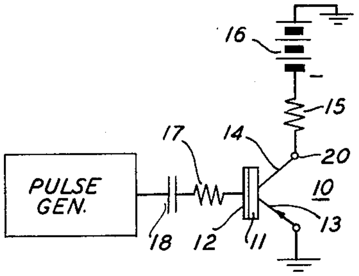

This invention relates to methods of treating semiconductive translators and more particularly to methods of improving the response of transistors to certain signals.

It has been observed in the operation of transistors that the flow of current carriers exhibits an inertia type effect which for some applications is undesirable. For example, in some switching circuits employing transistors, switching from the high collector current to the low collector current condition is effected by applying an impulse having a sharp wave front to change the base to emitter bias. The effect of this impulse as reflected on the output of the transistor is an initial voltage pulse of opposite polarity followed by a gradual decay of the signal to a new lower level which often requires a substantial time interval even to cross its original signal level. The interval from the initiation of the pulse until it passes through its initial value has been referred to as the cut-off time of the device and has been attributed to the storage of charge carriers within the semiconductive material. These storage effects have been visualized as a gradual release of stored minority charge carriers, holes, or positive charge carriers in n-type material, and electrons or negative charge carriers in p-type material from some storage means in the semiconductive body.

In some forms of transistors it is desired to cut off the output signal rapidly after the base to emitter input signal has been increased, as, for example, where the devices are employed for switching functions. A decrease in cut-off time is a desired improvement in the characteristics of these devices.

An object of this invention is to improve the electrical characteristics of semiconductive translators.

Another object is to reduce charge carrier storage in point contact semiconductive transistors.

A further object is to mechanically test certain translator structures while effecting an improvement in charge carrier storage.

One feature of this invention resides in subjecting a transistor to elevated temperatures for a substantial period as a step in its manufacture whereby minority charge carrier storage is reduced.

Another feature resides in subjecting a formed point contact transistor to a plurality of temperature cycles wherein it is raised from ambient temperature to a predetermined temperature and is held at that temperature a sufficient total time during the plurality of cycles employed to effect a reduction of charge carrier storage. The temperature cycling affords a means of indicating tendencies toward mechanical failure.

Another feature resides in heat treating a formed point contact transistor at temperatures of from about 60° C. to about 350° C. for periods of from a few minutes to several thousand hours to reduce charge carrier storage. The maximum temperature employed in this treatment is usually fixed as the temperature at which some element of the structure deteriorates excessively while the minimum temperature is determined on an economic basis, since, where a particular improvement is sought, length of heat treatment increases with a decrease of temperature. Advantageously, most semiconductive translators manufactured at this time can be heat treated in a range from about 70° C. to about 120° C. Generally, it may be stated that the degree of improvement in charge carrier storage is closely related to the product of a function of the temperature of treatment and a function of the length of the treatment period and that as the temperature is increased the time may be decreased to effect a particular degree of improvement. For example, a number of point contact germanium transistors after being held at 100° C. for about two hours exhibited an average reduction of cut-off time of about 27 per cent while a number of similar units held at 70° C. for about two hours had their cut-off time reduced an average of about 15 per cent.

Figure 2A:
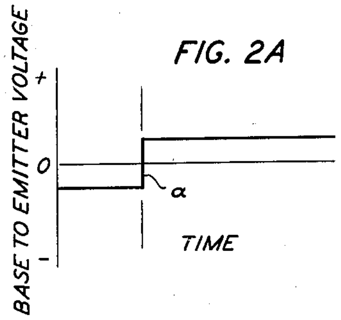
Figure 2B:
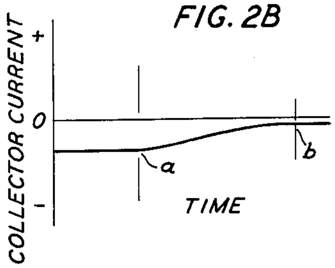
Figure 2C:
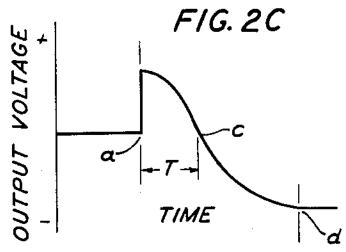
Figure 3:
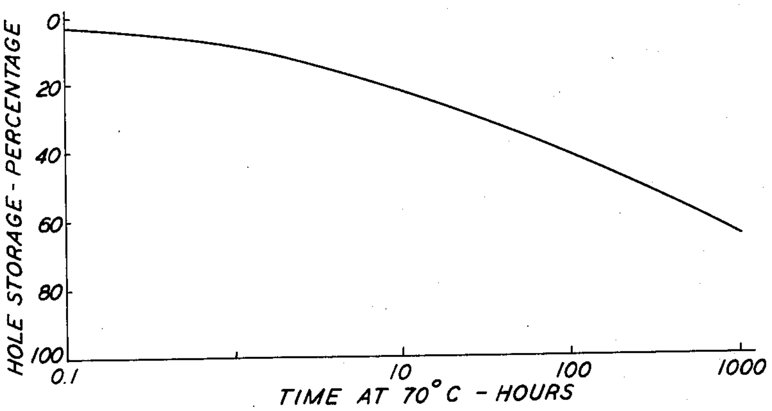

The above and other objects and features of this invention may be more fully understood from the following detailed description when read in conjunction with the accompanying drawing in which:

Fig. 1 depicts a typical switching circuit employing a transistor;

Figs. 2A, 2B, and 2C are wave forms of voltage and current against time for the circuit of Fig. 1, illustrating the effects of charge carrier storage, and Fig. 3 is a plot of percentage reduction in charge carrier storage against heat treatment time plotted on a logarithmic scale for a large number of units heat treated at about 70° C.

The following discussion while generally applicable to transistors will be directed particularly to an exemplary embodiment utilizing a particular transistor form and switching circuit. Thus, the transistor 10 shown in the circuit of Fig. 1 from which the results shown in Fig. 3 was obtained comprises a beaded point contact device of the general form disclosed in application Serial No. 198,294 filed November 30, 1950 for J. V. Domaleski, E. L. Gartland, and J. J. Kleimack, now Patent 2,688,110, issued August 31, 1954. This transistor has an n-type single crystal germanium wafer 11 having a resistivity of 3.0 to 5.5 ohm-centimeters. The rear surface of the wafer is copper plated and soldered to a copper strip forming a base connection 12, with a lead-tin 45—55 solder. Pointed 5 mil wires of beryllium-copper and phosphor-bronze are employed as the emitter 13 and collector 14, respectively. The emitter and collector are separated from each other on the germanium surface a distance of 2 mils. As is shown in the above-noted application, the region surrounding the emitter and collector contacts, and the germanium surface is covered with a globule of polyethylene-polyisobutylene and the entire structure is encapsulated in a bead of casting resin. The collector connection of this unit has been formed by condenser discharge pulsing so that the collector voltage is equal to or less than —3 volts with an emitter current of +1 milliampere and a collector current of —2 milliamperes, and a collector voltage equal to or less than —4 volts when the emitter current is +3 milliamperes and the collector current is —5.5 milliamperes.

In the circuit of Fig. 1, the transistor 10 is connected with its emitter 13 grounded and its collector 14 connected through a resistance 15 of 4700 ohms to the negative terminal of a 45 volt battery 16. The base 12 is connected through a thousand ohm resistor 17, and a .02 microfarad condenser 18 to a pulse generator having a 50 ohm internal resistance. In the absence of a pulse, the emitter is biased positive relative to the base by the d. c. collector current flowing from battery 16, through resistor 15, collector connection 14, the transistor body 11, and emitter connection 13. On the arrival of a pulse having a sharp wave front at time *a* as indicated in Fig. 2A, the base voltage is shifted positive relative to the emitter as shown. The collector, which was formerly in the conducting condition by virtue of the emitter bias continues for a short while to be conducting due to the minority carriers that were injected into the region of the body surrounding it by the emitter. These minority carriers remain in the body after the removal of the hole injecting emitter bias by virtue of a storage process. Thus, the collector current appears as shown in Fig. 2B. At time *a* it begins to decay until it eventually reaches a new condition which is substantially at zero current at time *b*.

The output voltage of the circuit is observed at the point 20 intermediate the collector and the resistor 15 and appears as shown in Fig. 2C. The pulse applied to the base connection in addition to driving the base positive relative to the emitter tends to raise the potential of the base connection relative to the collector. However, by virtue of the charge carrier storage which has occurred in the collector region of the semiconductor, the collector region continues to act as a low impedance, and initially a positive pulse appears in the output of the transistor at time *a* as shown in Fig. 2C. As the charge carriers in the collector region are drawn off, the impedance of that region increases towards an eventual collector cut-off condition as shown at time *d*. The cut-off time of the transistor has been defined as the interval T which represents the time required for the output voltage to decay to that value which was present when the transistor was in the on condition as shown at *c*. It is to be understood that the above is merely illustrative of charge carrier storage and that cut-off time for a particular unit will vary somewhat with the associated circuit and that cut-off time varies with unit design and even from unit to unit in a single design. Cut-off times vary in units having the form of the example from 0.1 to 5 microseconds prior to their being subjected to the process of this invention.

In accordance with this invention the cut-off time of transistors or the charge carrier storage observed in transistor semiconductive translators can be reduced by a heat treatment which is usually applied to the units after they are completely housed and impregnated. In the case of devices having point contacts the treatment is applied after the electrical forming steps. However, the terminology as employed here "a formed transistor" is intended to include an electrically formed point contact transistor, a bonded transistor wherein an *n—p* junction is formed by bonding, or a transistor having a semiconductive body containing an emitter or collector junction formed by other means.

The curve of Fig. 3 illustrates the improvement obtained in heat treating at about 70° C. a number of beaded n-type germanium point contact transistors constructed as described above. The curve illustrates the percentage decrease in the cut-off time T observed in these units when subjected to heat treating intervals extending from one-tenth to 1000 hours. The initial cut-off time of these units ranged from 1.3 to 5.5 microseconds and averaged 2.9 microseconds. It will be observed that a decrease of about 10 per cent has been effected in the cut-off time in a heat treatment interval of one hour. The reduction continues to 1000 hours at which point the cut-off time has been reduced by about 45 per cent. Similar curves can be plotted for other temperatures of heat treatment. It will be found that such curves will fall below the plotted curve when plotted for higher heat treatment temperatures, while at lower heat treating temperatures they will be above the plotted curve.

It will appear from the above that where speed of processing is important it is desirable to employ as high temperatures as possible to reduce charge carrier storage. Since this treatment is applied after the device has been assembled and usually after it has been encapsulated, temperatures must be held below those which will effectively destroy any essential element of the unit. Thus, possible limitations to be considered as to what maximum temperature should be utilized are: the encapsulating material, particularly mechanical or chemical changes therein; physical changes in the spring contacts whereby their resiliency is lost; and the melting temperature of the solder employed in making contacts to the semiconductor body. While germanium and silicon bodies can be effectively heat treated to reduce carrier storage over a wide range extending from about 60° C. to about 350° C., practically such a wide range of temperatures would not be employed since temperatures at the lower limit would be economically unfeasible due to their slowness and the temperatures at the upper limit would cause deterioration of the units. At present it appears most advantageous to heat treat units between 70° C. and about 120° C.

The exemplary units having beaded casings have been heat treated while maintaining a reasonable balance between economy in production and product yield at temperatures between about 70° C. and about 100° C. over a range of time intervals of from one to 50 hours. A second advantage can be obtained by applying this heat treatment as a series of temperature cycles since this effects a mechanical testing of the structures which indicate any tendency towards their failure. Thus, improved units have been obtained in processing formed transistors of the type described above by subjecting them to four temperature cycles from an ambient temperature of about 20° C. to about 75° C. and holding them at that temperature a half hour during each cycle, thus they are held at 75° C. for a total period of two hours.

It is to be understood that the above-described processes are illustrative of the application of the principles of the invention. Numerous other combinations of processing steps may be devised by those skilled in the art without departing from the spirit and scope of the invention.

What is claimed is:

1. The method of fabricating a transistor having a reduced minority carrier storage which comprises applying emitter, base, and restricted contact area collector electrodes to a germanium body, passing current between the collector electrode and the body to electroform the collector, and then subjecting the assembled electrodes and body to a plurality of temperature cycles from ambient temperature to about 75° C., each cycle being for about one-half hour.

2. The method of fabricating a transistor having a reduced minority carrier storage which comprises applying emitter, base, and restricted contact area collector electrodes to a germanium body, passing current between the collector electrode and the body to electroform the collector, and then subjecting the electrodes and body assembly to a temperature of about 75° C. for a period of about two hours.

3. The method of fabricating a transistor having a reduced minority carrier storage which comprises applying emitter, base, and restricted contact area collector electrodes to a semiconductive body of a material selected from the group consisting of germanium and silicon, passing current between the collector electrode and the body to electroform the collector electrode, and then subjecting the electrodes and body assembly to a temperature between about 70° C. and about 120° C. for a period of from one-tenth to several thousand hours.

4. The method of fabricating a transistor having a reduced minority carrier storage which comprises applying emitter, base, and restricted contact area collector electrodes to a semiconductive body of a material selected from the group consisting of germanium and silicon, passing current between the collector electrode and the body to electroform the collector electrode, then subjecting the electrodes and body assembly to a plurality of temperature cycles from ambient temperature to a maximum of from about 70° C. to about 120° C., and maintaining said electrodes and body assembly at a temperature between about 70° C. and about 120° C. for a total period from about one-tenth of an hour to a few thousand hours.

References Cited in the file of this patent

UNITED STATES PATENTS

| | | |
|---|---|---|
| 2,395,259 | Ellis et al. | Feb. 19, 1946 |
| 2,464,066 | Addink et al. | Mar. 8, 1949 |
| 2,639,246 | Dunlap, Jr. | May 19, 1953 |